United States Patent [19]

Lechot

[11] 3,875,830
[45] Apr. 8, 1975

[54] DEVICE FOR FEEDING AN AUTOMATIC LATHE WITH BARS TO BE MACHINED

[76] Inventor: André Lechot, 2534 Orvin, Switzerland

[22] Filed: May 22, 1973

[21] Appl. No.: 362,767

[30] Foreign Application Priority Data
June 26, 1972 Switzerland.......................... 9583/72
Mar. 9, 1973 Switzerland.......................... 3470/73

[52] U.S. Cl. .................................................. 82/2.7
[51] Int. Cl. ............................................... B23b 13/00
[58] Field of Search ............................... 82/2.5, 2.7

[56] References Cited
UNITED STATES PATENTS

| | | | |
|---|---|---|---|
| 2,319,963 | 5/1943 | Wilson et al. | 82/2.5 |
| 2,742,656 | 4/1956 | Fischer | 82/2.7 |
| 3,042,252 | 7/1962 | Konrad | 82/2.7 X |
| 3,131,587 | 3/1964 | Spohn et al. | 82/2.7 |
| 3,205,737 | 9/1965 | Ogren | 82/2.5 |
| 3,266,348 | 8/1966 | Mancia | 82/2.5 |
| 3,602,075 | 8/1971 | Waefler | 82/2.5 |

Primary Examiner—Harrison L. Hinson
Attorney, Agent, or Firm—Robert E. Burns; Emmanuel J. Lobato; Bruce L. Adams

[57] ABSTRACT

A device for feeding an automatic lathe with bars to be machined has a sliding headstock and a moveable carriage mounted on a slideway to the rear of the frame of the automatic lathe so that the carriage can be displaced parallel to the axis of a bar to be machined. Said carriage received and carries a cylindrical tubular sleeve coaxial with the axis of rotation of the jaws of the headstock. Further jaws are rotatably mounted in said sleeve and are positioned at the end of said sleeve, adjacent to and facing the jaws of the headstock and serve to prevent recoil of a bar to be machined. The carriage is able to be displaced between two fixed stops into at least two positions. One position is a working position in which said tubular sleeve is engaged in a seating provided in the body of the frame of the headstock; the other position is for feeding in which said further jaws grasp a fresh bar to be machined enabling the fresh bar to be fed by said carriage into said headstock. Said carriage also serves to hold a bar during the machining thereof and to extract the bar residue remaining after machining in the jaws of the headstock.

8 Claims, 6 Drawing Figures

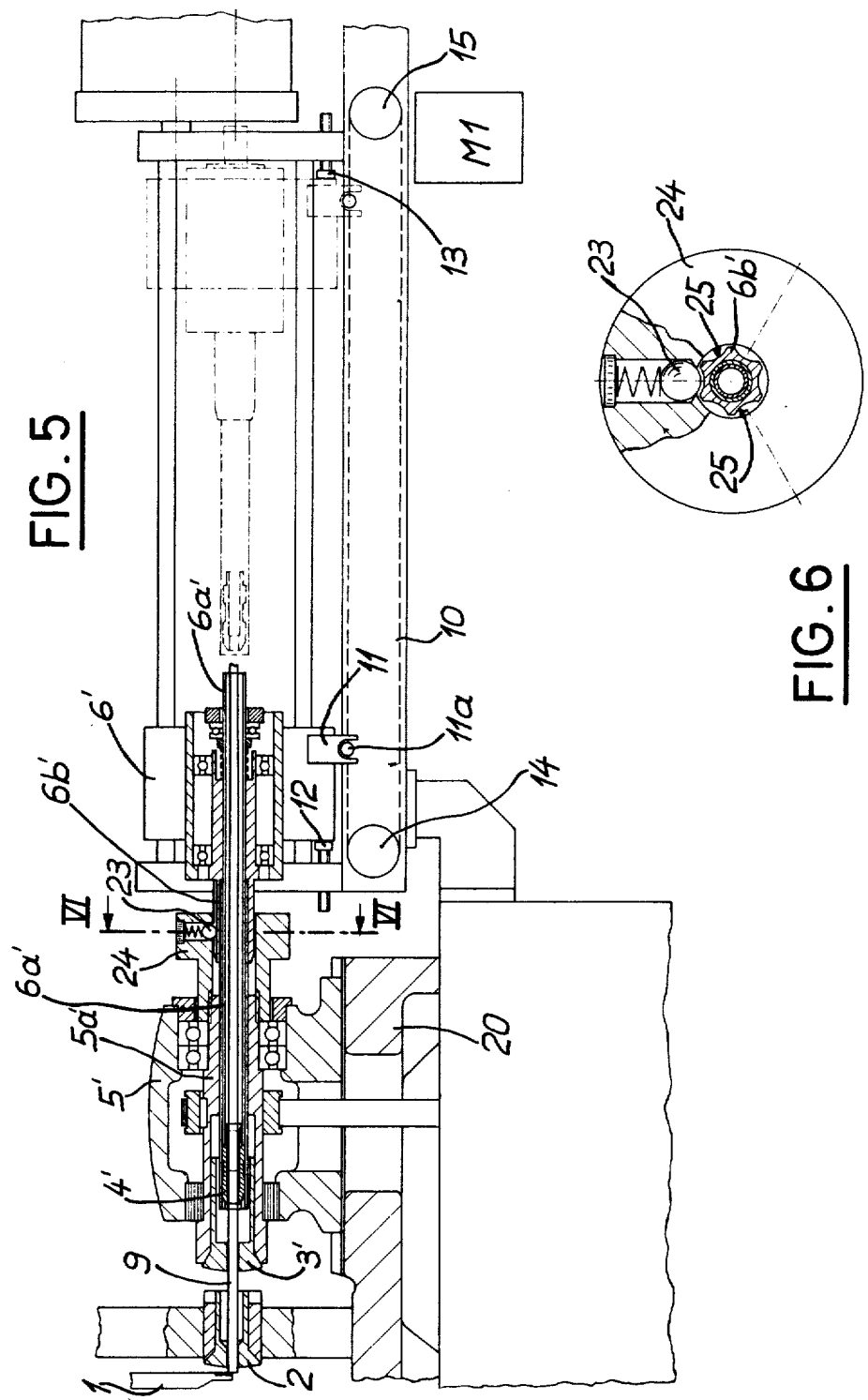

1

DEVICE FOR FEEDING AN AUTOMATIC LATHE WITH BARS TO BE MACHINED

The present invention relates to a device for feeding an automatic lathe with bars to be machined with a sliding headstock.

Numerous devices of this kind are known in which the new bar to be machined drops into a tube opening longitudinally and is then pushed by means of a pusher towards the jaws of the headstock. All these known devices are complicated and have a very high manufacturing cost.

The object of the invention is to create a particularly simple feed device having a manufacturing cost very much lower than that of the known devices.

According to the invention there is provided a device for feeding an automatic lathe with bars to be machined with sliding headstock, comprising jaws in said headstock for gripping a bar to be machined, a movable carriage mounted on a slideway fixed to the rear of a frame of the automatic lathe said carriage being displaceable parallel to the axis of a bar to be machined, said carriage carrying a cylindrical tubular sleeve coaxial with the axis of rotation of said jaws of the headstock, further jaws for preventing the recoil of the bar to be machined said further jaws being rotatably mounted in said sleeve and being situated at the end of the sleeve adjacent to and facing said jaws of the headstock, said carriage being able to be displaced between two fixed stops into at least two positions, one position for working in which said sleeve is engaged in a seating provided in the body of the frame of the headstock and the other position is for feeding in which said further jaws grasp a fresh bar to be machined enabling the fresh bar to be fed by said carriage into said headstock, said carriage also serving to hold a bar during the machining thereof and to extract the bar residue remaining after machining in said jaws of the headstock.

The accompanying drawings illustrate, by way of example, a first form of embodiment of a device according to the invention in different stages of operation, and a second form of embodiment of the invention.

FIG. 5 is a view in elevation and partial section of the second embodiment of a device of the invention, and FIG. 6 is a view of a detail of this second embodiment.

Figure 1:
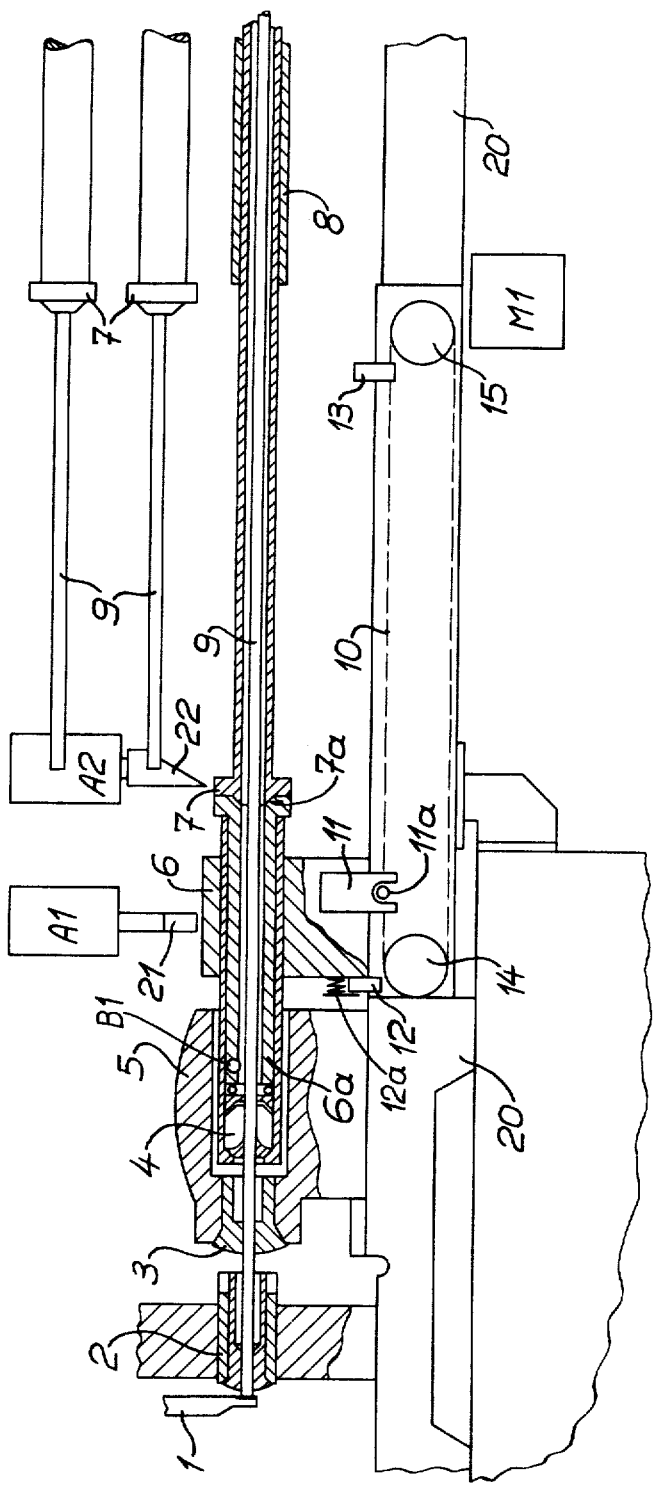
FIG. 1 is a view in elevation, partially in section, of a first embodiment of a device of the invention in operation.

The first form of embodiment of the device, represented in FIGS. 1 to 4, is mounted on the frame 20 of an automatic lathe with a sliding headstock 5. This lathe mahines a bar 9 driven in rotation and in translation, as known, by the jaws 3 and the sliding headstock. The bar can pass, in known manner, through a tailstock sleeve 2 so as to be machined by a tool 1.

The device illustrated consists of a movable carriage 6 mounted for sliding on a slideway fixed to the rear of the frame 20 of the lathe and can be displaced parallel to the axis of the bar 9. This carriage 6 carries a cylindrical tubular sleeve 6a coaxial with the axis of rotation of the jaws 3 of the headstock. Jaws 4 are mounted in this sleeve at its end adjacent to jaws 3 and are adapted to prevent any recoil of the bar. This carriage can be displaced between two fixed stops 12 and 13. It is driven by a fork 11 rigidly connected to the carriage 6 and embracing a roller 11a fixed to a chain 10 passing over two sprocket wheels 14, 15, the latter being driven by the motor M1. In a modification, not illustrated, this carriage 6 could be driven by a linear electric motor or by a hydraulic or pneumatic piston. The bar 9 to be machined is held in feed tube 7 mounted in a distributor 8, not illustrated, which may be either a drum or another known distributor device. This feed tube is terminated by a conical centring portion 7a which engages in a corresponding recess in the sleeve 6a.

The device further comprises gripping jaws 21 controlled by an electro-magnet A1, these jaws 21 being adapted to extract the bar end remaining after machining.

The device also comprises a bar positioner 22 working under the action of an electro-magnet A2.

The device also comprises microswitches B1 and B3, the operation of which will be described further on.

Figure 2:
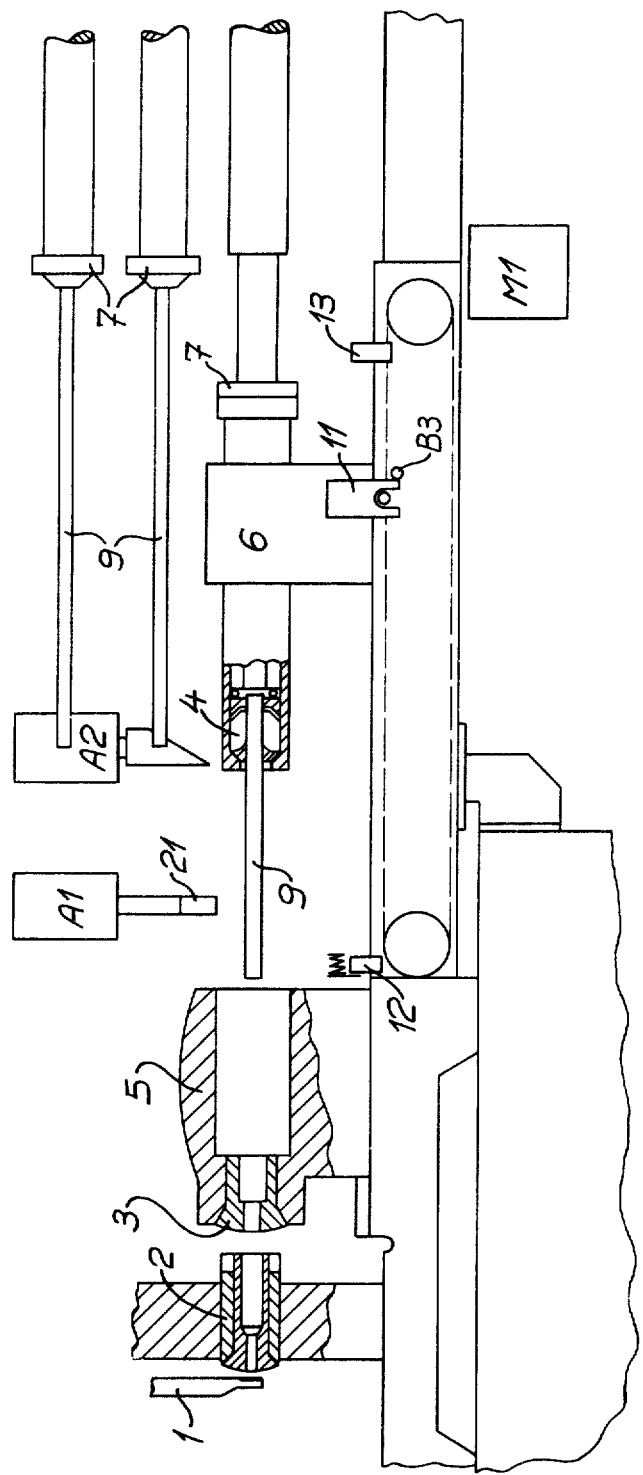
FIGS. 2, 3 and 4 represent different stages of operation of this device.
Figure 3:
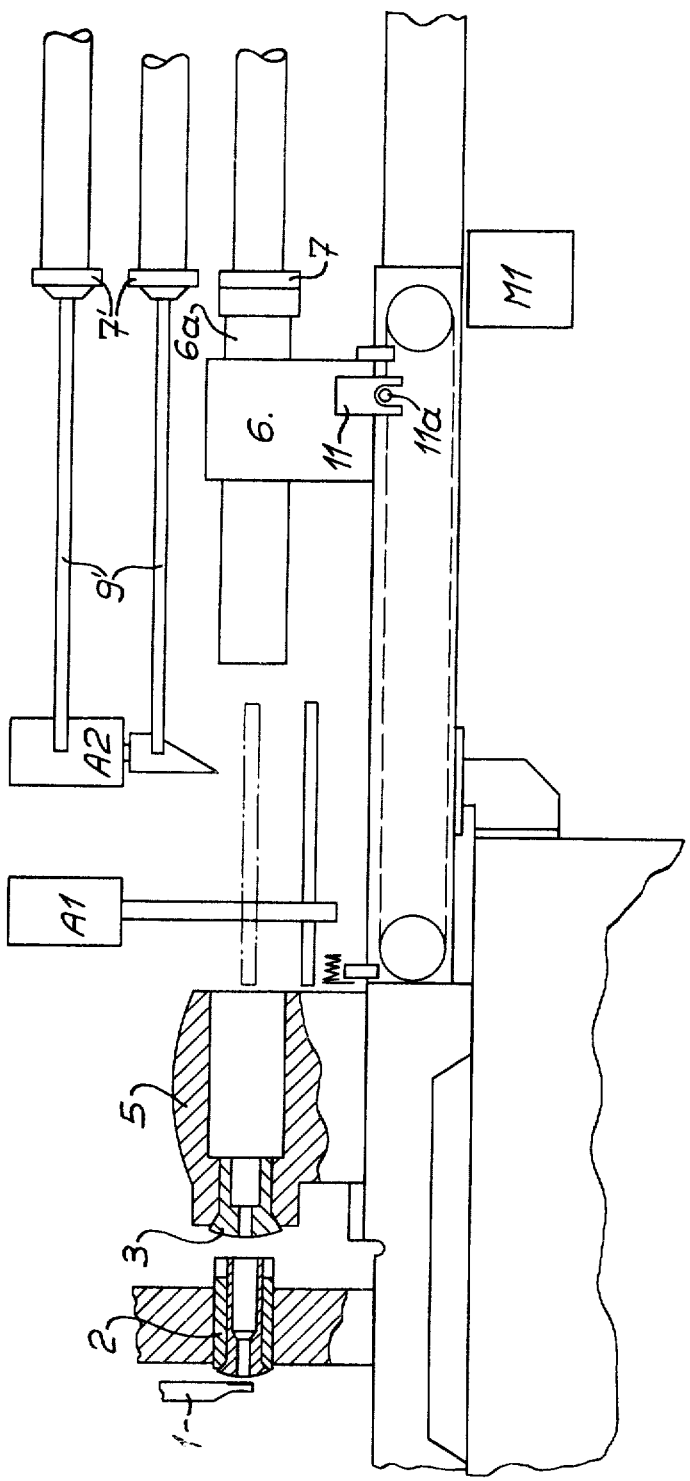
Figure 4:
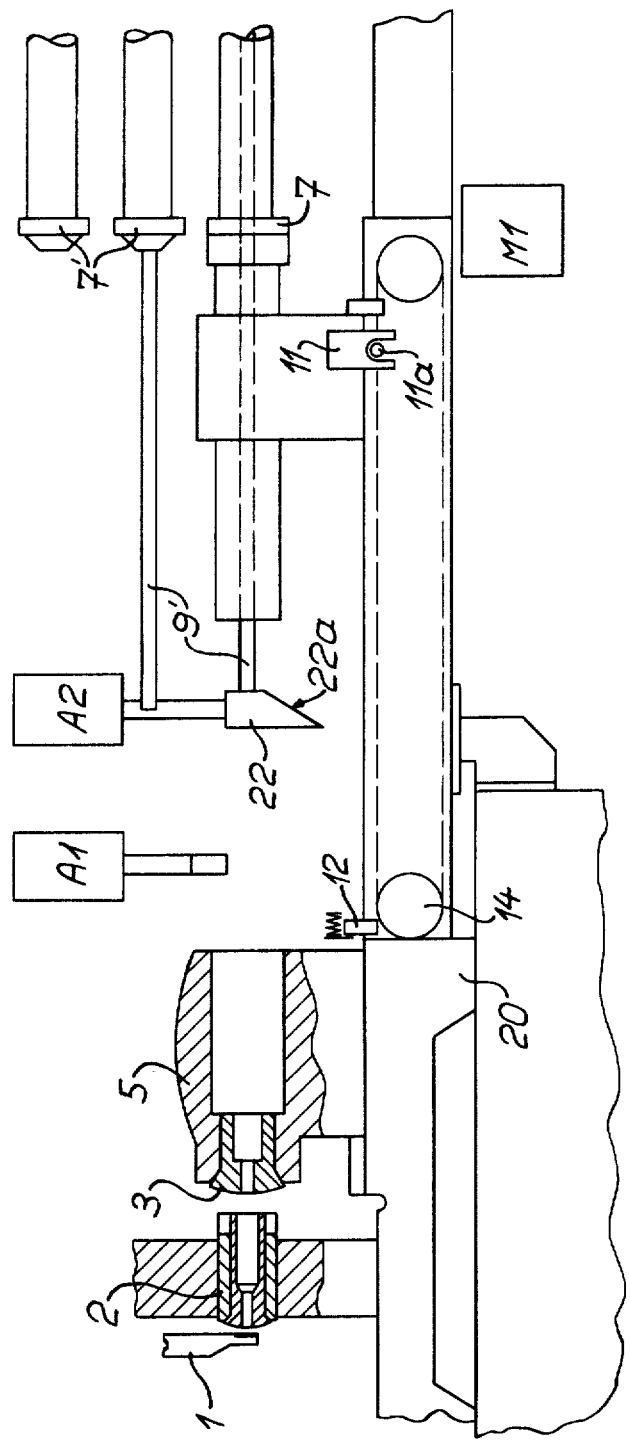

The operation of the device is as follows: as illustrated in FIG. 1, after a machined part has been parted off, the successive steps of closing of the jaws 4, opening of the jaws 3, followed by closing of the jaws 3 and opening of the jaws 4 are effected. These operations are performed in succession for machining part of the bar and thereafter parting off, and so on until the end of the bar, opposite to that which is then being machined, passes beyond the feeler of the microswitch B1. At this moment, the jaws 3 open, and the jaws 4 close on the remaining waste end of bar. The motor M1 then causes the carriage 6 to move back until the fork 11 comes into contact with the feeler of the microswitch B3 (FIG. 2) which controls the stopping of the motor M1 driving the carriage 6. Once the latter has been stopped, the electro-magnet A1 is energized and its gripping jaws 21 begin to grasp the waste end of bar 9 (FIG. 2). The jaws 4 are opened and at this moment the motor M1 drives the carriage further back until the fork 11 abuts against a slop 13. In this position, the waste end is extracted from the pincers 4 then rejected as illustrated in FIG. 3. Thereupon the empty feed tube 7 is disconnected from the sleeve 6a. When this disconnection has been effected, the carriage moves forward rapidly into its end position in the headstock and a fresh feed tube 7 containing a fresh bar 9 is introduced coaxially with the sleeve and the jaws 3. The carriage then moves back rapidly, the fresh bar 9 passes through the sleeve 6a and its open jaws 4 and the feed tube 7 is connected to the sleeve 6a. At this moment, the bar positioner 22 is actuated by the electromagnet A2. This positioner comprises an inclined face 22a which pushes the bar back into a precise and predetermined position permitting satisfactory machining of the first part. When this positioning has been effected, the jaws 4 close, the motor M1 starts and the bar comes into its precise position in the pincers 3 of the headstock 5 and in the sleeve 2, then the operation described previously begins again.

In a modification, a compensating spring 12a could be provided enabling the slight recoil of the bar to be taken up on closure of the jaws 3.

It is understood that the microswitches described could be replaced by other equivalent members without departing from the invention: proximity detectors which may be magnetic or optical for example. Similarly, the electro-magnets A1 and A2 could be replaced by double-acting hydraulic or pneumatic pistons.

In the second form of the device illustrated in FIG. 5, the same parts bear the same reference numerals. This device is mounted on the frame 20 of an automatic lathe with a headstock 5. This lathe machines a bar 9 driven in rotation and in translation, in known manner, with the aid of jaws 3' of the headstock 5'. The bar can pass, in known manner, through sleeve 2 in order to be machined by a tool 1.

The device illustrated comprises a movable carriage 6' mounted for sliding on a slideway fixed to the rear of the frame 20 of the lathe. The carriage can be displaced parallel to the axis of the bar 9. This carriage carries a cylindrical tubular sleeve 6a' coaxial with the axis of rotation of a spindle 5a' of the headstock, this spindle carrying jaws 3'. Jaws 4' are mounted in this sleeve at its end adjacent to the jaws 3', and are adapted to prevent any recoil of the bar. The carriage 6' can be displaced between two fixed stops 12 and 13. It is driven by a fork 11 rigidly connected to the carriage 6 and enclosing a roller 11a fixed to a chain 10 passing over two sprocket wheels 14, 15, the latter being driven by the motor M1. In a modification, not illustrated, this carriage could be driven by a linear electric motor or by a hydraulic or pneumatic piston. The bar to be machined 9 is held in feed tube mounted in a distributor, not illustrated, which may be either a drum or another known distributor device.

This device further comprises gripping jaws controlled by a first electromagnet, these jaws being adapted to extract the bar end remaining after machining.

It also comprises a bar positioner working under the action of a second electro-magnet.

These accessories which are similar to those in the main patent are not illustrated in the drawing.

The operation of the device is as follows: during the course of machining the bar 9, as illustrated in FIG. 1, after a machined part has been parted off, the closing of the jaws 4', the opening of the jaws 3', the ensuing closing of the jaws 3', and opening of the jaws 4' are effected in succession (machining of a part and its parting off) and so on until the end of the bar opposite to that which is being machined passes beyond a certain threshold where it is detected. At this moment, the jaws 3' open, the jaws 4' close on the remaining waste end of the bar. The motor M1 causes the carriage 6' to move back until the fork 11 comes into contact with a microswitch feeler which controls the stopping of the motor M1 driving the carriage 6'. Once the latter has been stopped, the first electro-magnet is energized and the jaws which it controls grasp the waste end of the bar. The jaws 4' are opened and at this moment the motor M1 drives the carriage until the fork 11 abuts against stop 13. In this position the waste end is extracted from the jaws 4' then rejected. In this position, the empty reduction tube is disconnected from the sleeve 6a'. When this disconnection has been effected, the carriage moves forward rapidly into its end position in the headstock and a fresh feed tube containing a fresh bar appears coaxially with the sleeve and the jaws 3. The carriage then moves back rapidly and the fresh bar 9 passes through the sleeve 6a' and its jaws 4' and the feed tube is connected to the sleeve 6a'. At this moment, the bar positioner is actuated by the second electro-magnet. As in the embodiment of FIGS. 1 to 4, this positioner comprises an inclined face which pushes the bar back into a precise and predetermined position permitting satisfactory machining of the first part. When this positioning has been effected, the jaws 4' close, the motor M1 starts and the bar 9 comes into its precise position in the jaws 3' of the headstock 5' and in the tailstock sleeve 2, then the operation described previously begins again.

In order to avoid any wear of the jaws and/or marking of the bar, the tubular sleeve 6a' is driven in rotation at a speed equal to that of the spindle 5a' of the headstock 5' as soon as the bar 9 arrives in the vicinity of the jaws 3'.

This drive may be effected, as illustrated in the drawing, by a coupling such as that illustrated in partial section in FIG. 6, in the following way.

The carriage 6' carries the tubular sleeve 6a, coaxial with the spindle of the headstock 5'. This sleeve 6a' is mounted for rotation in the carriage 6', by means of ball bearings for example. This sleeve is extended by a projecting portion 6b0 adapted to be coupled in rotation with the spindle 5a'. This coupling in rotation can be effected for example by one or more balls 23 which can be displaced radially in a flange 24 rigidly connected to the spindle 5a' of the headstock and cooperating with parallel, angularly aquidistant grooves 25 formed in the projecting portion 6b' of the sleeve 6a'.

As a result of this coupling, the sleeve 6a' is driven in rotation by the spindle 5a'. The grooves 25 are formed along the whole length of the projecting portion 6b', and the headstock 5' can thus be displaced axially along the whole length of this projecting portion 6b' with its sleeve 6a' rotating at the speed of the spindle of the headstock. This length corresponds to the maximum machining length of the lathe.

It is obvious that the sleeve could be caused to rotate at the speed of the spindle of the headstock by other means, in particular by a motor and a pulley rigidly connected to the carriage.

I claim:

1. A device for feeding bars for machining in an automatic lathe having a headstock, comprising jawsin the headstock releasably gripping a bar to be machined, a movable carriage mounted on a slideway fixed to the rear of the automatic lathe, said carriage being displaceable parallel to the axis of a bar to be machined, a cylindrical tubular sleeve rotatably mounted on said carriage coaxial with the axis of rotation of said jaws of the headstock, means for displacing said carriage, between two fixed stops, into at least two positions, one position for machining in which said sleeve is engaged with the headstock, and another position for reception of a fresh bar, and further jaws mounted in said sleeve to grasp a fresh bar to be inserted into said headstock, whereby said sleeve holds the bar during the machining thereof and said carriage allows extraction of bar residue remaining after machining and insertion of a fresh bar in said jaws of the headstock.

2. A device as claimed in claim 1, further comprising a feed tube surrounding portions of the bar to be machined, said feed tube being terminated by a conical portion engageable with a cooperating conical portion of said sleeve, and means for temporary rigid interconnection of said conical portions.

3. A device as claimed in claim 2, further comprising a plurality of feed tubes carrying bars to be machined, said plurality of feed tubes being disposed for insertion of said tubes one after the other in a position coaxial with said sleeve.

4. A device as claimed in claim 1, in which said tubular sleeve is mounted in said carriage for rotation, in its working position, as a headstock spindle.

5. A device as claimed in claim 4, including a drive spindle for the headstock and a drive mechanism coupling said tubular sleeve and said spindle.

6. A device as claimed in claim 4, including a motor for reciprocating said sleeve.

7. A device as claimed in claim 1, further comprising a bar positioner for adjusting to a specific value the length of a bar to be machined emerging from said tubular sleeve.

8. A device as claimed in claim 1, further comprising an extractor for extracting the waste end of a bar after machining thereof.

* * * * *